UNITED STATES PATENT OFFICE.

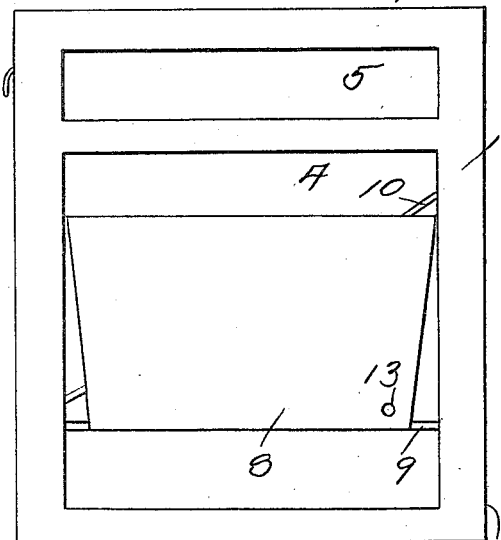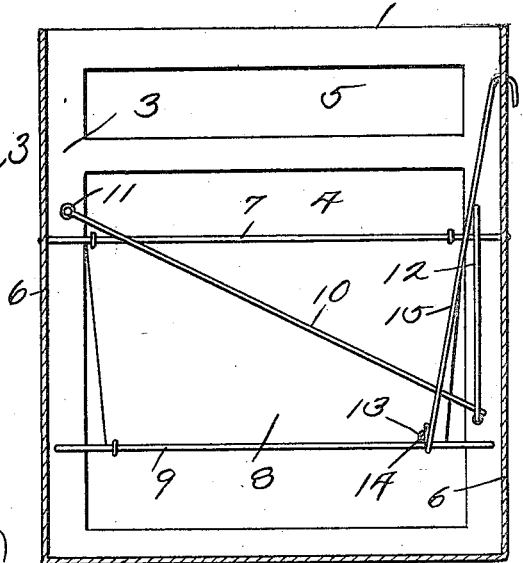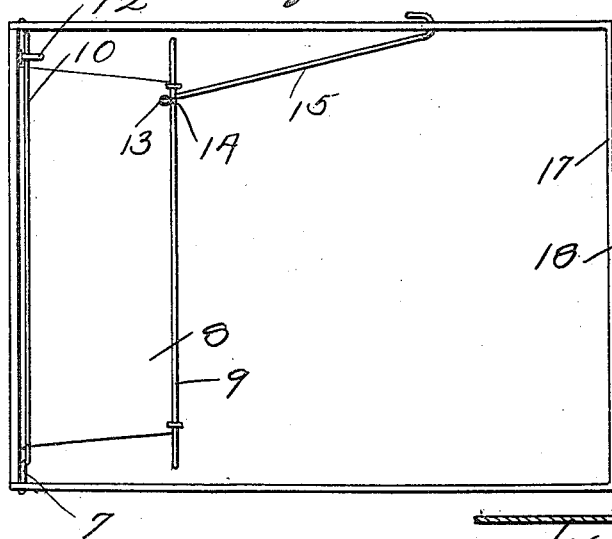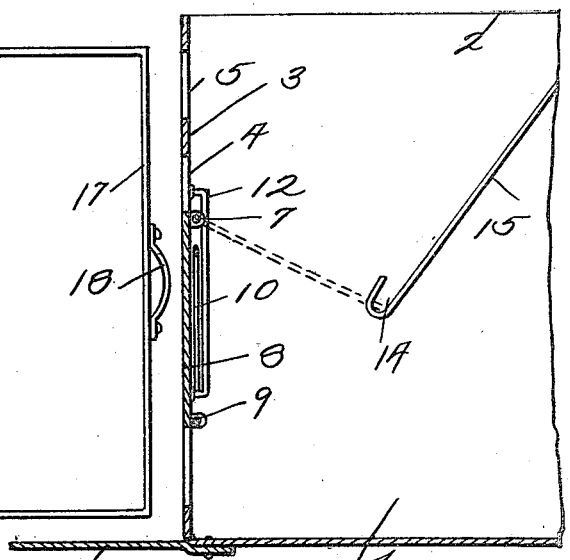

ROBERT N. WALTERS, OF AVALON, WISCONSIN.

POULTRY TRAP-NEST.

1,267,020.  Specification of Letters Patent.  Patented May 21, 1918.

Application filed October 4, 1916. Serial No. 123,701.

*To all whom it may concern:*

Be it known that I, ROBERT N. WALTERS, a citizen of the United States, residing at Avalon, in the county of Rock, State of Wisconsin, have invented certain new and useful Improvements in Poultry Trap-Nests; and I do hereby declare the following to be a full, clear, and exact description of the invention, such as will enable others skilled in the art to which it appertains to make and use the same.

The present invention is directed to improvements in poultry trap nests, and has for its object to provide a device of this character so constructed that when the hen enters the nest the door will be automatically closed so as to prevent the hen leaving the nest, or another hen entering the nest.

A further object of the invention is to provide a device of this character having an extremely simple means for automatically locking the door to prevent the trapped hen from leaving the nest.

With these and other objects in view, this invention resides in the novel features of construction, formation, combination and arrangement of parts to be hereinafter more fully described, claimed, and illustrated in the accompanying drawing, in which:—

Figure 1 is a front elevation of the device, showing the door in its locked position.

Fig. 2 is a transverse sectional view through the nest, the door being locked.

Fig. 3 is a longitudinal sectional view.

Fig. 4 is a top plan view of the nest with the cover open, and the door in its set position.

Referring to the drawing 1 designates the nest box, which is preferably formed from suitable sheet metal, and is provided with an open top 2, whereby the trapped hen can be lifted from the box so as to not scatter the nest material or break the eggs.

The front 3 of the box is provided with a doorway 4, and formed above the same is an opening 5, which in connection with the doorway affords proper ventilation to the box. Having its ends journaled in the sides 6 of the box and adjacent the front 3 thereof is a rod 7, which is spaced slightly below the upper end of the doorway, and has fixed thereto the upper edge of the door 8, said door being formed from sheet metal. The door 8 is thus so mounted as to be capable of swinging inwardly, and to limit the outward swinging movement thereof a rod 9 is fixed to its lower edge, said rod being of such length that the ends thereof will engage the front 3 on opposite sides of the doorway. Thus it will be seen that after a hen is trapped should it attempt to leave the nest box the rod 9 will prevent the door swinging outwardly, and compel the hen to remain in the box until released. It will be noted that the lower edge of the door 8 is spaced above the sill of the doorway a slight distance so as to assure proper ventilation and at the same time prevent hens of normal sizes from leaving the box by passing under the door.

It is necessary in devices of this kind to prevent other hens from entering the nest after one has been trapped, and to accomplish this a bar 10 is provided, and has one end pivotally connected to the front 3 of the box 1, as at 11, the free end of said bar being slidable in a guide loop 12 also carried by the front of the box. When the door 8 is in its open position the bar 10 is engaged with the upper end thereof, and adjacent the rod 7, but it will be obvious that when the door is closed the bar will swing downwardly until the free end thereof engages the lower end of the loop 12, at which time the bar will be disposed diagonally across the inner surface of the door, thus holding the same firmly locked.

The lower end of the door 8 has formed therein an opening 13 which is adapted to be engaged by the hook 14 carried by the lower end of the rod 15, said rod having its upper end pivotally connected to one side of the box 1. When the hook is engaged in the opening the door 8 will be held in its open position, but when the hen enters the doorway 4 its back will engage the lower edge of the door thus raising the same until the hook 14 disengages the opening 13, whereupon the door will swing to its closed position and the bar 10 will swing downwardly and hold the door locked to prevent another hen from entering the box.

Secured to the front 3 and below the doorway 4 is a platform 16 upon which the fowls alight previous to entering the doorway.

The rear wall 17 of the box is provided exteriorly with a handle 18, whereby the box can be conveniently handled.

It is obvious that when the nests are under the dropping boards the open tops 2 will be closed thereby, thus preventing the hens from escaping, but it will be of course understood that the nests can be equipped with tops if desired, and can be made in any sizes.

What is claimed is:—

A nest of the class described comprising a box, a doorway formed in the front of said box, a door pivotally supported by the front for partially closing said doorway and having its pivot extending parallel with said front to permit of the door swinging toward and away therefrom, a hooked rod pivotally supported at one end of said box and adapted to engage the free end of said door for holding the same in its open position, a bar pivotally supported by said front and engaged with the upper end of the door when the same is open and adapted to swing downwardly with the door when moving to closing position and to extend diagonally of the door to hold the same closed, a guide for said bar carried by said box, and a rod carried by the free end of said door and adapted to contact said front to limit the outward movement of the door.

In testimony whereof, I affix my signature, in the presence of two witnesses.

ROBERT N. WALTERS.

Witnesses:
  JOHN L. FISHER,
  ALMA WALTERS.

Copies of this patent may be obtained for five cents each, by addressing the "Commissioner of Patents, Washington, D. C."